(No Model.)
J. H. ELLIS.
DEVICE FOR PREVENTING HORSES FROM CRIBBING.
No. 275,370. Patented Apr. 10, 1883.
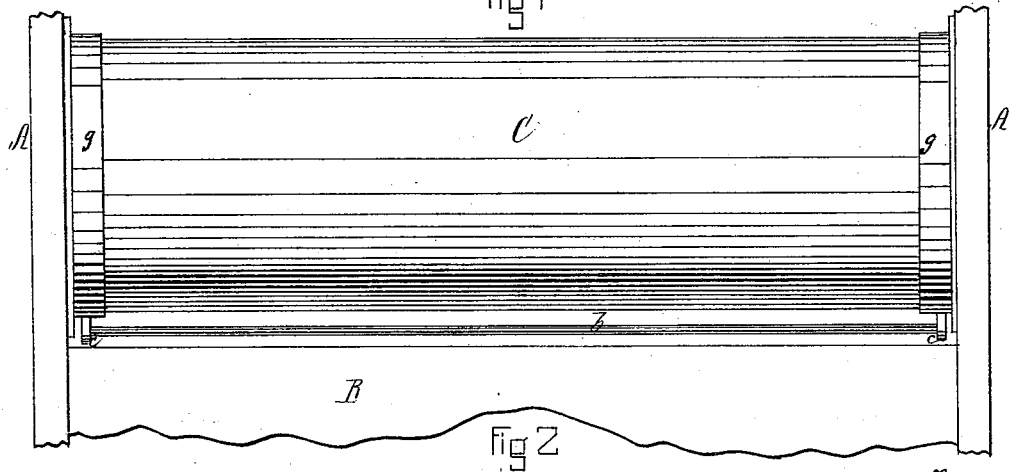
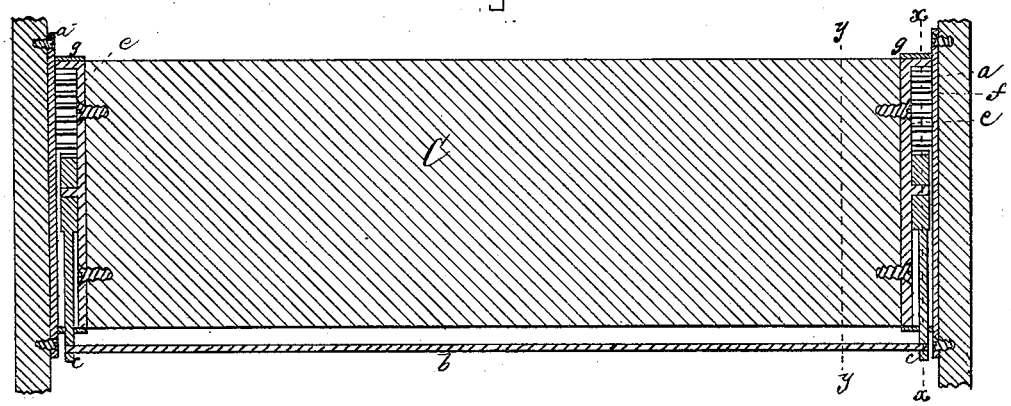
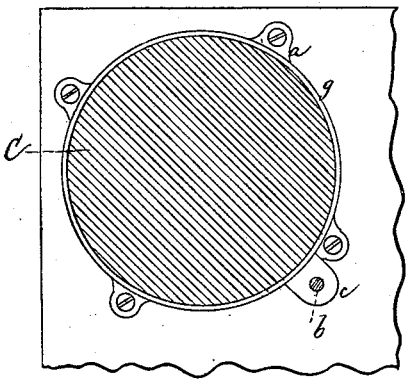
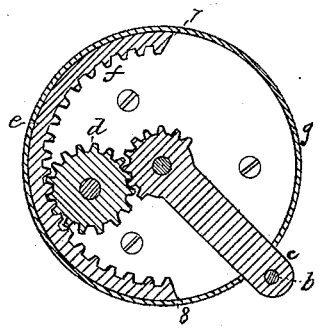
WITNESSES
INVENTOR
John H. Ellis

UNITED STATES PATENT OFFICE.

JOHN H. ELLIS, OF BOSTON, MASSACHUSETTS.

DEVICE FOR PREVENTING HORSES FROM CRIBBING.

SPECIFICATION forming part of Letters Patent No. 275,370, dated April 10, 1883.

Application filed August 13, 1881. (No model.)

*To all whom it may concern:*

Be it known that I, JOHN H. ELLIS, a citizen of the United States, residing at Boston, in the county of Suffolk and State of Massachusetts, have invented an Improved Device for Preventing Horses from Cribbing, of which the following is a full, clear, and exact description, reference being had to the accompanying drawings, making part of this specification, in which—

Figure 1 is an elevation of my improved device applied to a stall. Fig. 2 is a longitudinal section through the same. Fig. 3 is a section on the line $x\ x$ of Fig. 1. Fig. 4 is a section on the line $y\ y$ of Fig. 1.

My invention has for its object to prevent horses from crib-biting; and it consists in a roll provided with a rod operated by mechanism to be hereinafter described and claimed.

In the said drawings, A represents the sides of a stall, and B the manger. Immediately above the front edge of the manger B is a long wooden roll, C, which revolves in bearings in plates $a$, secured to the sides A of the stall when the animal's teeth are applied thereto. $b$ is a long rod of metal, which is secured at each end to arms $c$, projecting out a short distance from the roll C, these arms being hung on the journals of the roll. The lower or inner ends of these arms $c$ are provided with gear-teeth which mesh with the teeth of gears $d$, which revolve on studs projecting from the plates $a$. $e$ are annular rings of metal, which are secured firmly to each end of the roll C. Each of these rings $e$ is provided with gear-teeth $f$, which extend half-way round their interior periphery and engage with the intermediate gears, $d$. The periphery of the rings $e$ are cut away from 7 to 8 to allow the arms $c$ to project outside the roll C. The joints at the intersection of the plates $a$ and rings $e$ are covered with loose metal bands or ferrules $g$ for the purpose of preventing any dirt or feed from getting in between the joints and preventing the free and easy working of the gears, these bands being also provided with slots just large enough for the arms $c$ to project through.

The operation of my invention is as follows: When a horse lays violently hold of the wooden roll C with his teeth and curbs his neck the roll C will revolve, and at the same time, through the connections described, the rod $b$ is brought up with a quick motion and strikes the horse under the chin, which causes him to let go the roll, when it will immediately return to the position seen in Fig. 3, ready to be again brought into use.

What I claim as my invention is as follows:

The combination, with the roll C, of the rod $b$, arms $c$, gears $d$, and annular rings having gear-teeth $f$, and the plates $a$, secured to the sides of the stall, all constructed to operate substantially as described.

JOHN H. ELLIS.

In presence of—
JAMES A. ELLIS,
WM. E. QUIMBY.